(12) United States Patent
Konishi et al.

(10) Patent No.: US 8,900,753 B2
(45) Date of Patent: Dec. 2, 2014

(54) CATHODE MATERIAL FOR LI ION SECONDARY BATTERY AND LI ION SECONDARY BATTERY USING THE SAME

(75) Inventors: Hiroaki Konishi, Hitachi (JP); Toyotaka Yuasa, Hitachi (JP); Mitsuru Kobayashi, Hitachiota (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 1036 days.

(21) Appl. No.: 12/542,991

(22) Filed: Aug. 18, 2009

(65) Prior Publication Data

US 2010/0081055 A1 Apr. 1, 2010

(30) Foreign Application Priority Data

Sep. 30, 2008 (JP) .................. 2008-252156

(51) Int. Cl.
*H01M 4/13* (2010.01)
*H01M 10/0525* (2010.01)
*H01M 4/36* (2006.01)
*H01M 4/505* (2010.01)
*H01M 4/525* (2010.01)
*H01M 4/1391* (2010.01)
*H01M 4/62* (2006.01)

(52) U.S. Cl.
CPC ........ *H01M 10/0525* (2013.01); *H01M 4/1391* (2013.01); *H01M 4/364* (2013.01); *H01M 4/366* (2013.01); *H01M 4/505* (2013.01); *H01M 4/525* (2013.01); *H01M 4/625* (2013.01); *Y02E 60/122* (2013.01)
USPC ............ 429/231.3; 429/231.1; 429/223; 429/224; 429/232; 429/217; 429/233

(58) Field of Classification Search
CPC ....... H01M 4/364; H01M 4/52; H01M 4/525; H01M 10/0525; H01M 2004/028; H01M 4/366; H01M 4/505; H01M 4/625; Y02E 60/122
USPC ........... 429/231.3, 231.1, 223, 224, 232, 217, 429/233
See application file for complete search history.

(56) References Cited

U.S. PATENT DOCUMENTS

2005/0106463 A1 5/2005 Kikuchi et al.
2006/0257745 A1* 11/2006 Choi et al. ................. 429/231.3
2009/0239143 A1* 9/2009 Miyazaki et al. ............. 429/223

FOREIGN PATENT DOCUMENTS

EP 1 453 126 A1 9/2004
JP 2002-042890 2/2002

(Continued)

OTHER PUBLICATIONS

European Search Report of Appln. No. 09167714.6 dated Oct. 22, 2009 in English.

(Continued)

*Primary Examiner* — Laura Weiner
(74) *Attorney, Agent, or Firm* — Antonelli, Terry, Stout & Kraus, LLP.

(57) ABSTRACT

A cathode material with excellent capacity and output characteristics and safety, and a lithium ion secondary battery using the same is provided. The invention relates to a cathode material which includes a mixture of a cathode active material having a large primary particle size with excellent capacity characteristics and represented by the composition formula: $Li_{x1}Ni_{a1}Mn_{b1}Co_{c1}O_2$, where $0.2 \leq x1 \leq 1.2$, $0.6 \leq a1$, $0.05 \leq b1 \leq 0.3$, $0.05 \leq c1 \leq 0.3$, and another cathode active material having a small primary particle size with excellent output characteristics and represented by the composition formula: $Li_{x2}Ni_{a2}Mn_{b2}Co_{c2}O_2$, where $0.2 \leq x2 \leq 1.2$, $a2 \leq 0.5$, $0.05 \leq b2 \leq 0.5$, $0.05 \leq c2 \leq 0.5$. The invention also relates to a lithium ion secondary battery using the cathode material.

2 Claims, 2 Drawing Sheets

(56) References Cited

FOREIGN PATENT DOCUMENTS

| JP | 2002-319398 | 10/2002 |
| JP | 2003-077459 | 3/2003 |
| JP | 2007-048711 | 2/2007 |
| WO | WO 2004/027903 A1 | 4/2004 |

OTHER PUBLICATIONS

Chinese Office Action of Appln. 200910204490.6 dated Dec. 26, 2011 with English translation.

* cited by examiner

CATHODE MATERIAL FOR LI ION SECONDARY BATTERY AND LI ION SECONDARY BATTERY USING THE SAME

CLAIM OF PRIORITY

The present application claims priority from Japanese patent application serial No. 2008-252156 filed on Sep. 30, 2008, the content of which is hereby incorporated by reference into this application

BACKGROUND OF THE INVENTION

1. Field of the Invention

The present invention relates to a cathode material for a lithium (Li) ion secondary battery having excellent capacity and output characteristics and safety, and to a Li ion secondary battery using the same.

2. Description of the Related Art

In order to adopt a Li ion secondary battery as a battery for hybrid cars, it is necessary to achieve reduction in cost, volume, and weight of the battery, while maintaining high safety. Thus, a cathode material is required to have high capacity, high output, and high safety.

Japanese Unexamined Patent Publication No. 2002-42890 discloses that lithium nickel oxide particles have the surfaces coated with particles of lithium cobalt oxide or lithium manganese oxide having a low surface catalytic function, whereby the lithium nickel oxide has the reduced surface catalytic function and thus is stabilized.

In the application of this technique to the batteries for the hybrid cars, the stability of the oxides is high, and also the safety of the cathode material is high. However, the surfaces of the lithium nickel oxide particles are coated, which may lead to an increase in resistance of the battery, resulting in insufficient output characteristics thereof.

On the other hand, Japanese Unexamined Patent Publication No. 2002-319398 discloses that mixing of a lithium cobalt composite oxide containing different kinds of elements and another lithium nickel composite oxide containing different kinds of elements prevents oxidation and dissolution of substitution elements by electron exchange between these two materials. The application of the technique to the battery for a hybrid car suppresses the dissolution of transition metal from the oxide, and thus improves cycle characteristics. However, the problem of a cathode material with a high content of Ni, that is, instability of a structure of the cathode material in charging is caused to release oxygen from the structure, which cannot be suppressed. As a result, when the internal temperature of the battery is increased due to internal short circuit or the like, the possibility of ignition becomes high. The formation of fine primary particles by a granulation method or the like does not appear in the lithium cobalt oxide, so that an adequate contact area between an active material and an electrolyte cannot surely be obtained, resulting in insufficient output characteristics. Furthermore, since the cobalt content of the transition metal elements in the lithium cobalt composite oxide of the cathode material is high, which makes it difficult to adopt the cathode material in the battery for the hybrid car.

Japanese Unexamined Patent Publication 2007-48711 discloses that particles of a cathode active material are coated with a stable composite oxide containing at least one of nickel and manganese thereby to improve chemical stability. In the application of the technique to the battery for the hybrid, the stability of the oxide is high, and also the safety of the cathode material is high. However, the surfaces of the oxide particles are coated, which may lead to an increase in resistance of the battery, resulting in insufficient output characteristics thereof.

In order to adopt a Li ion secondary battery as the battery for a hybrid car, the Li ion secondary battery is required to have high capacity, high output, and high safety. These characteristics are closely related to the properties of a cathode material. In the layered cathode material represented by the composition formula of $LiMO_2$ (M: transition metal), a Ni content on the transition metal site needs to be increased so as to improve the capacity characteristics.

The inventors focus their attention on a mixture of two kinds of cathode materials with different properties so as to simultaneously achieve the high capacity, high output, and high safety.

The features of the invention will be described below.

According to a first aspect of the invention, a cathode material includes a first cathode active material represented by the composition formula: $Li_{x1}Ni_{a1}Mn_{b1}Co_{c1}O_2$, where $0.2 \le x1 \le 1.2$, $0.6 \le a1$, $0.05 \le b1 \le 0.3$, $0.05 \le c1 \le 0.3$, and having an average primary particle size of not less than 1 μm nor more than 3 μm, and a second cathode active material represented by the composition formula: $Li_{x2}Ni_{a2}Mn_{b2}Co_{c2}O_2$, where $0.2 \le x2 \le 1.2$, $a2 \le 0.5$, $0.05 \le b2 \le 0.5$, $0.05 \le c2 \le 0.5$, and having an average primary particle size of not less than 0.05 μm nor more than 0.5 μm.

An average secondary particle size of the first cathode active material is not less than 5 μm nor more than 30 μm, and an average secondary particle size of the second cathode active material is not less than 2 μm nor more than 10 μm. The average secondary particle size of the first cathode active material is 1.5 times or more as large as that of the second cathode active material.

A content of the first cathode active material in the cathode material is not less than 15% nor more than 70% in terms of percentage by mass.

A difference in Ni content between the first cathode active material and the second cathode active material is equal to or more than 20% in terms of atomic percentage.

According to a second aspect of the invention, a lithium ion secondary battery is provided which includes a cathode for absorbing and releasing lithium and an anode for absorbing and releasing lithium formed with an electrolyte positioned therebetween. The cathode includes a cathode active material, a cathode mixture containing a carbon-based conductive agent and a binder, and a current collector. The cathode active material includes two kinds of lithium oxides with different Ni contents, each containing Li, Ni, Mn, and Co, and a difference in Ni content between the cathode active materials is equal to or more than 20% in terms of atomic percentage.

The cathode active material includes a first cathode active material and a second cathode active material. A Ni content of the first cathode active material is larger than that of the second cathode active material, and an average primary particle size of the first cathode active material is larger than that of the second cathode active material.

The first cathode active material is represented by the formula: $Li_{x1}Ni_{a1}Mn_{b1}Co_{c1}O_2$, where $0.2 \le x1 \le 1.2$, $0.6 \le a1$, $0.05 \le b1 \le 0.3$, $0.05 \le c1 \le 0.3$, and the second cathode active material is represented by the formula: $Li_{x2}Ni_{a2}Mn_{b2}Co_{c2}O_2$, where $0.2 \le x2 \le 1.2$, $a2 \le 0.5$, $0.05 \le b2 \le 0.5$, $0.05 \le c2 \le 0.5$.

According to a third aspect of the invention, a lithium ion secondary battery is provided which includes a cathode for absorbing and releasing lithium and an anode for absorbing and releasing lithium formed with an electrolyte positioned therebetween. The cathode includes a cathode active material, a cathode mixture containing a carbon-based conductive agent and a binder, and a current collector. The cathode active material which includes lithium oxides containing Li, Ni, Mn, and Co includes a first cathode active material and a second cathode active material. A Ni content of the first cathode active material is larger than that of the second cathode active material, and an average primary particle size of the first cathode active material is larger than that of the second cathode active material.

An average secondary particle size of the first cathode active material is not less than 5 μm nor more than 30 μm, and an average secondary particle size of the second cathode active material is not less than 2 μm nor more than 10 μm. The average secondary particle size of the first cathode active material is 1.5 times or more as large as that of the second cathode active material.

The invention can provide a cathode material for a lithium ion secondary battery with excellent capacity and output characteristics and safety, and a lithium ion secondary battery with the excellent characteristics.

DETAILED DESCRIPTION OF THE PREFERRED EMBODIMENTS

The present invention will be described in detail below.

A layered cathode active material represented by the composition formula of $LiMO_2$ (M: transition metal) needs to have an increased Ni content on the transition metal site so as to improve the capacity characteristics. However, the cathode active material with a high content of Ni has low structural stability in charging, which is a problem of safety. Thus, an exothermic reaction needs to be suppressed by decreasing a contact area with an electrolyte.

On the other hand, in order to improve the output characteristics, it is necessary to make the particle size of the primary particles smaller, thus increasing the contact area with the electrolyte. In this case, another cathode material with a low content of Ni, which has the high structural stability in charging, needs to be used so as to enhance the safety.

Figure 1:
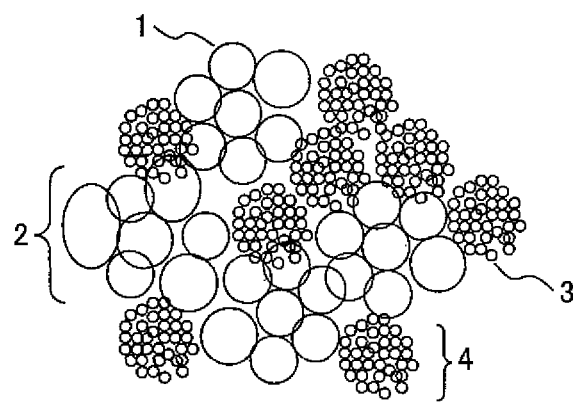
FIG. 1 is an pattern diagram of the form of particles of a mixed cathode material including a cathode active material with a high content of Ni composed of particles with a large particle size, and another cathode active material with a low content of Ni composed of particles with a small particle size according to the invention.

The invention focuses its attention on the mixing of a cathode active material with a high content of Ni having a low surface area and another cathode active material with a low content of Ni having a high surface area so as to provide a cathode material with excellent capacity and output characteristics and safety. Mixing of the active material having the high surface area with the other material can obtain high output characteristics. Further, decreasing the Ni content in the material with the high surface area can maintain the high safety even in charging. The mixing of these two kinds of active materials with different characteristics can provide the cathode material which ensures high safety with the excellent capacity and output characteristics. FIG. 1 illustrates: primary particle 1 of cathode active material with a high content of Ni; secondary particle 2 of cathode active material with a high content of Ni; primary particle 3 of cathode active material with a low content of Ni; and secondary particle 4 of cathode active material with a low content of Ni.

The invention focuses its attention on the fact that an average secondary particle size of the cathode material with a high content of Ni is 1.5 times or more as large as that of the cathode material with a low content of Ni. This is because a difference in secondary particle size between the two kinds of active materials can cause the active material with a small particle size to enter a gap between the active material particles with a large particle size, which can improve a mixed state of two kinds of the active materials, and can simultaneously achieve the high capacity and the high output for the first time. Further, the filling rate of secondary particles can be improved. The improvement of the filling rate results in an increase in amount of the active material per unit volume, which can improve the volume energy density of the battery.

Additionally, the invention focuses its attention on a mixing process of the active materials. The two kinds of active materials are not mixed as they are, but each active material and conductive agent are combined into a composite compound by a device, such as a mechanofusion system, or a hybridizer, before mixing the active materials. Thereafter, two kinds of the composite compounds, each composed of the active material and the conductive agent, are mixed together. This method forms a conductive network between the active materials because the surfaces of the active materials are coated with the respective conductive agents in mixing the different active materials. Thus, the rate of the isolated active material which does not contribute to the charging and discharging reaction can be reduced, which can obtain a high capacity.

Now, one preferred embodiment for carrying out the invention will be described below.

The inventors focus their attention on mixing of two kinds of cathode materials with two kinds of layered structures represented by the composition formula of $Li_xNi_aMn_bCo_cO_2$ as follows. That is, a difference in atomic percentage of Ni between the transition metal of a first cathode active material and the transition metal of a second cathode active material is equal to or more than 20%. The average primary particle size of the first cathode active material with a high content of Ni is not less than 1 μm nor more than 3 μm. The average primary particle size of the second cathode active material with a low content of Ni is not less than 0.05 μm nor more than 0.5 μm.

The atomic percentage of Ni in the transition metal elements of the cathode active material having the layered structure greatly contributes to the capacity characteristics and safety of the active material. The difference in atomic percentage of Ni in the transition metal elements between these active materials is preferably equal to or more than 20%. The cathode active material with a high content of Ni having a large primary particle size has the excellent capacity characteristics, and the cathode active material with a low content of Ni having a small primary particle size has the excellent output characteristics. Mixing of these active materials can achieve the high capacity, high output, and high safety at the same time.

In contrast, when a difference in Ni content between two kinds of the active materials with the different composition ratios is equal to or less than 20% in terms of atomic percentage, the above-mentioned effects cannot be obtained. The cathode active material with a high content of Ni can obtain the high capacity characteristics. However, since the active material with a high content of Ni, which has the low structural stability in charging, has a small particle size, a reaction area with an electrolyte may become large thus to cause ignition at low temperature. On the other hand, the active material with a low content of Ni has excellent output characteristics and safety, but has the very low capacity characteristics. The two kinds of cathode active materials whose Ni contents are close to each other cannot achieve the high capacity, high output, and high safety at the same time.

Further, the first cathode active material is preferably represented by the formula: $Li_{x1}Ni_{a1}Mn_{b1}Co_{c1}O_2$ ($0.2 \leq x1 \leq 1.2$, $0.6 \leq a1$, $0.05 \leq b1 \leq 0.3$, $0.05 \leq c1 \leq 0.3$).

The amount of Li is preferably represented by the formula: $0.2 \leq x1 \leq 1.2$. For $x1 < 0.2$, the amount of Li existing in a Li layer is small during charging, and thus the layered crystal structure cannot be maintained. For $1.2 < x1$, the amount of transition metal elements in the composite oxide is decreased, which leads to deterioration of capacity characteristics of the lithium ion secondary battery.

The amount of Ni is preferably represented by the formula: $0.6 \leq a1$. For $a1 < 0.6$, the Ni content mainly contributing to the charging and discharging reactions is decreased, which leads to deterioration of capacity characteristics of the battery.

The amount of Mn is preferably represented by the formula: $0.05 \leq b1 \leq 0.3$. For $b1 < 0.05$, the structure becomes unstable in charging, leading to a decrease in temperature of releasing oxygen from the cathode. For $b1 > 0.3$, the Ni content mainly contributing to the charging and discharging reactions is decreased, which leads to deterioration of capacity characteristics of the battery.

The amount of Co is preferably represented by the formula: $0.05 \leq c1 \leq 0.3$. For $c1 < 0.05$, the crystal structure becomes unstable, resulting in an increase in resistance, and in degradation in output characteristics. For $c1 > 0.3$, the Ni content mainly contributing to the charging and discharging reactions is decreased, which leads to deterioration of capacity characteristics of the battery.

The average primary particle size and the average secondary particle size of the first cathode active material are preferably not less than 1 μm nor more than 3 μm, and not less than 5 μm nor more than 30 μm, respectively. In the case of making the primary particle size smaller than this range, the contact area of the particles with the electrolyte is increased. When the internal temperature of the battery is increased due to internal short circuit or the like, the reaction between the electrolyte and oxygen discharged from the crystal structure is likely to lead to ignition. It is difficult to industrially manufacture an active material comprising particles having a primary particle size of not less than 1 μm nor more than 3 μm, and a secondary particle size of 5 μm or less. In contrast, an active material having a larger particle size than the range has a surface area decreased, so that a contact area between the electrolyte and the particles is decreased, which drastically degrades the output characteristics at high rate.

The second cathode active material is preferably represented by the formula: $Li_{x2}Ni_{a2}Mn_{b2}Co_{c2}O_2$ ($0.2 \leq x2 \leq 1.2$, $a2 \leq 0.5$, $0.05 \leq b2 \leq 0.5$, $0.05 \leq c2 \leq 0.5$).

The amount of Li is preferably represented by the formula: $0.2 \leq x2 \leq 1.2$. For $x2 < 0.2$, the amount of Li existing in a Li layer is small during charging, and thus the layered crystal structure cannot be maintained. For $1.2 < x2$, the amount of transition metal elements in the composite oxide is decreased, which leads to deterioration of capacity characteristics of the lithium ion secondary battery.

The amount of Mn is preferably represented by the formula: $0.05 \leq b2 \leq 0.5$. For $b2 < 0.05$, the structure becomes unstable during charging, resulting in a decrease in temperature of releasing oxygen from the cathode. For $b2 > 0.5$, the Ni content mainly contributing to the charging and discharging reactions is decreased, which leads to deterioration of capacity characteristics of the battery.

The amount of Co is preferably represented by the formula: $0.05 \leq c2 \leq 0.5$. For $c2 < 0.05$, the crystal structure becomes unstable, resulting in an increase in resistance, and in degradation in output characteristics. For $c2 > 0.5$, the Ni content mainly contributing to the charging and discharging reactions is decreased, which leads to deterioration of capacity characteristics of the battery.

The average primary particle size and the average secondary particle size of the second cathode active material are preferably not less than 0.05 μm nor more than 0.5 μm, and not less than 2 μm nor more than 10 μm, respectively. It is difficult to industrially manufacture an active material composed of particles having a smaller particle size than the range. In contrast, an active material composed of particles having a larger particle size than the range has a surface area decreased, so that a contact area between the electrolyte and the particles is decreased, which drastically degrades the output characteristics of the battery at high rate.

The average secondary particle size of the first cathode active material is preferably 1.5 times or more as large as that of the second cathode active material. When the average secondary particle size of the first cathode active material is below 1.5 times as large as that of second cathode active material, the distribution of the secondary particle sizes in the mixed cathode active material becomes narrow. As a result, this makes it difficult to introduce the second cathode active material into a gap between the first cathode active materials, leading to a decrease in filling ratio of the cathode material, and also reduction in volume energy density.

The content of the first cathode active material in the cathode material is preferably not less than 15% nor more than 70% in terms of percentage by mass. For the first cathode active material content below 15%, the amount of the cathode active material with a high content of Ni is decreased, which leads to deterioration of the capacity characteristics. In contrast, for the first cathode active material content above 70%, the amount of primary particles having a small particle size is decreased, which leads to deterioration of the output characteristics.

The ratio of the amount of particles of the second cathode active material entering a gap between particles of the first cathode active material to that of the other particles is decreased, thus making it difficult to form the network between the particles. Thus, the ratio of the amount of the isolated active material particles not contributing to the charging and discharging to that of the other particles cannot be decreased, so that an adequate capacity cannot be ensured. Since the ratio of the amount of the active material including the primary particles with a small particle size to that of the other material is small, the characteristics of the battery at high rate becomes deteriorated.

Before mixing the two kinds of active materials, each active material is combined with a corresponding conductive agent into a composite compound. The two kinds of the active materials are not mixed together as they are, but each active material and the conductive agent are combined by a device, such as a mechanofusion system or a hybridizer, into the composite compound. Then, two kinds of the composite compounds are mixed together. This method can highly disperse the conductive agent over the surface of each active material, so that the surfaces of the particles of the active material can be coated with the conductive agent. The coating with the conductive agent improves electron conductivity of the battery, and thus the output characteristics. In mixing the different active materials with the conductive agent existing between the active materials, a conductive network can be formed between the active materials. Thus, the ratio of the amount of the isolated active material not contributing to the charging and discharging reactions to that of the other active material can be decreased, so that the output characteristics can be improved without deterioration of the capacity characteristics.

In contrast, when two kinds of active materials are mixed with a conductive agent without a process of combining the active material and the conductive agent into a composite compound, the surface of each active material is not coated with the conductive material, which results in lowered electron conductivity. Further, a mixed state between each active material and the conductive agent becomes deteriorated, making it difficult to form the conductive network between the active materials. Thus, the ratio of the amount of isolated active material to that of the other active material is increased, which results in a decrease in capacity of the battery.

Now, specific examples will be described below.

Example 1

Manufacturing of First Cathode Active Material

As raw material, nickel oxide, manganese dioxide, and cobalt oxide were weighed to have an atomic ratio of Ni:Mn:Co=70:15:15, and then pure water was added to the resulting mixture to form a slurry. The slurry was pulverized by a zirconia bead mill into particles having an average particle size of 0.2 μm. A polyvinyl alcohol (PVA) solution was added to the slurry by 1 wt % in terms of solid content ratio, mixed for further one hour, and granulated and dried by a spray drier. Lithium hydroxide and lithium carbonate were added to the granulated particles at an atomic ratio of Li:(NiMnCo)=1.05:1.

Then, the powder was heated at a temperature of 800 to 1100° C. for 20 to 40 hours to form crystals having a layered structure, which were thereafter crushed thereby to obtain the first cathode active material. After removing coarse particles having a particle size of 30 μm or more from the cathode active material by classification, the cathode active material was used to manufacture an electrode.

Manufacturing of Second Cathode Active Material

As raw material, nickel oxide, manganese dioxide, and cobalt oxide were weighed to have an atomic ratio of Ni:Mn:Co=40:30:30, and then pure water was added to the resulting mixture to form a slurry. The slurry was pulverized by the zirconia bead mill into particles having an average particle size of 0.2 μm. A polyvinyl alcohol (PVA) solution was added to the slurry by 1 wt % in terms of solid content ratio, mixed for further one hour, and granulated and dried by the spray drier. Lithium hydroxide and lithium carbonate were added to the granulated particles at an atomic ratio of Li:(NiMnCo)=1.05:1.

Then, the powder was heated at a temperature of 800 to 950° C. for 5 to 20 hours to form crystal shaving a layered structure, which were thereafter crushed thereby to obtain the second cathode active material. After removing coarse particles having a particle size of 30 μm or more from the cathode active material by classification, the cathode active material was used to manufacture the electrode.

The manufacturing methods of the first and second cathode active materials associated with the invention are not limited to those described above, and for example, the following method may be used.

Raw materials were weighed to obtain a target composition of Ni:Mn:Co, and then nickel manganese cobalt composite hydroxide particles were manufactured by a coprecipitation process. The nickel manganese cobalt composite hydroxide and the lithium hydroxide were weighed to have an atomic ratio of Li:(NiMnCo)=1.05:1, and then mixed sufficiently with strength to maintain the shape of the spherical secondary particle. Then, the particles were heated at a temperature of 800 to 1100° C. for 5 to 40 hours to form crystals having a layered structure, which were thereafter crushed thereby to obtain a cathode active material. Further, coarse particles having a particle size of 30 μm or more were removed by classification from the cathode active material.

In order to measure the particle sizes of the primary particles and the secondary particles of the active material manufactured in the above-mentioned method, a SEM measurement method and a particle size distribution method were performed. The primary particle size was defined by a Fret diameter. The average value of particle sizes of 100 primary particles observed by the SEM measurement was determined as the primary particle size of the particle. As to the secondary particle, the median diameter value obtained by the particle size distribution method was determined as the secondary particle size of the particle. These values were shown in Table 1.

TABLE 1

|  | First cathode active material composition | Second cathode active material composition | Difference of Ni content between two kinds of active materials (atomic percentage) | Primary particle size of first active material (μm) |
|---|---|---|---|---|
| Example 1 | $LiNi_{0.7}Mn_{0.15}Co_{0.15}O_2$ | $LiNi_{0.4}Mn_{0.3}Co_{0.3}O_2$ | 30 | 1.33 |
| Example 2 | $LiNi_{0.7}Mn_{0.15}Co_{0.15}O_2$ | $LiNi_{0.4}Mn_{0.3}Co_{0.3}O_2$ | 30 | 1.33 |
| Example 3 | $LiNi_{0.7}Mn_{0.15}Co_{0.15}O_2$ | $LiNi_{0.4}Mn_{0.3}Co_{0.3}O_2$ | 30 | 1.33 |
| Example 4 | $LiNi_{0.7}Mn_{0.15}Co_{0.15}O_2$ | $LiNi_{0.4}Mn_{0.3}Co_{0.3}O_2$ | 30 | 1.33 |
| Example 5 | $LiNi_{0.7}Mn_{0.15}Co_{0.15}O_2$ | $LiNi_{0.5}Mn_{0.25}Co_{0.25}O_2$ | 20 | 1.33 |
| Example 6 | $LiNi_{0.6}Mn_{0.2}Co_{0.2}O_2$ | $LiNi_{0.4}Mn_{0.3}Co_{0.3}O_2$ | 30 | 1.41 |
| Example 7 | $LiNi_{0.7}Mn_{0.15}Co_{0.15}O_2$ | $LiNi_{0.4}Mn_{0.3}Co_{0.3}O_2$ | 30 | 1.89 |
| Example 8 | $LiNi_{0.7}Mn_{0.15}Co_{0.15}O_2$ | $LiNi_{0.4}Mn_{0.3}Co_{0.3}O_2$ | 30 | 1.33 |
| Example 9 | $LiNi_{0.7}Mn_{0.15}Co_{0.15}O_2$ | $LiNi_{0.4}Mn_{0.3}Co_{0.3}O_2$ | 30 | 1.68 |
| Example 10 | $LiNi_{0.7}Mn_{0.15}Co_{0.15}O_2$ | $LiNi_{0.4}Mn_{0.3}Co_{0.3}O_2$ | 30 | 1.33 |
| Example 11 | $LiNi_{0.7}Mn_{0.15}Co_{0.15}O_2$ | $LiNi_{0.4}Mn_{0.3}Co_{0.3}O_2$ | 30 | 1.16 |
| Comparative Example 1 | — | $LiNi_{0.4}Mn_{0.3}Co_{0.3}O_2$ | — | — |
| Comparative Example 2 | $LiNi_{0.7}Mn_{0.15}Co_{0.15}O_2$ | — | — | 1.33 |
| Comparative Example 3 | $LiNi_{0.7}Mn_{0.15}Co_{0.15}O_2$ | $LiNi_{0.4}Mn_{0.3}Co_{0.3}O_2$ | 30 | 1.33 |

TABLE 1-continued

| | | | | |
|---|---|---|---|---|
| Comparative Example 4 | $LiNi_{0.7}Mn_{0.15}Co_{0.15}O_2$ | $LiNi_{0.4}Mn_{0.3}Co_{0.3}O_2$ | 30 | 1.33 |
| Comparative Example 5 | $LiNi_{0.7}Mn_{0.15}Co_{0.15}O_2$ | $LiNi_{0.6}Mn_{0.2}Co_{0.2}O_2$ | 10 | 1.33 |
| Comparative Example 6 | $LiNi_{0.5}Mn_{0.25}Co_{0.25}O_2$ | $LiNi_{0.4}Mn_{0.3}Co_{0.3}O_{02}$ | 10 | 1.18 |
| Comparative Example 7 | $LiNi_{0.7}Mn_{0.15}Co_{0.15}O_2$ | $LiNi_{0.4}Mn_{0.3}Co_{0.3}O_2$ | 30 | 0.79 |
| Comparative Example 8 | $LiNi_{0.7}Mn_{0.15}Co_{0.15}O_2$ | $LiNi_{0.4}Mn_{0.3}Co_{0.3}O_2$ | 30 | 1.33 |
| Comparative Example 9 | $LiNi_{0.7}Mn_{0.15}Co_{0.15}O_2$ | $LiNi_{0.4}Mn_{0.3}Co_{0.3}O_2$ | 30 | 1.62 |
| Comparative Example 10 | $LiNi_{0.7}Mn_{0.15}Co_{0.15}O_2$ | $LiNi_{0.4}Mn_{0.3}Co_{0.3}O_2$ | 30 | 1.33 |
| Comparative Example 11 | $LiNi_{0.7}Mn_{0.15}Co_{0.15}O_2$ | $LiNi_{0.4}Mn_{0.3}Co_{0.3}O_2$ | 30 | 1.09 |

| | Primary particle size of second active material (μm) | Secondary particle size of first active material (μm) | Secondary particle size of second active material (μm) | Contents of respective active materials in mixed cathode (percentage by mass) |
|---|---|---|---|---|
| Example 1 | 0.27 | 11.9 | 5.91 | 30:70 |
| Example 2 | 0.27 | 11.9 | 5.91 | 50:50 |
| Example 3 | 0.27 | 11.9 | 5.91 | 70:30 |
| Example 4 | 0.27 | 11.9 | 5.91 | 15:85 |
| Example 5 | 0.25 | 11.9 | 6.51 | 30:70 |
| Example 6 | 0.27 | 11.1 | 5.91 | 30:70 |
| Example 7 | 0.27 | 13.5 | 5.91 | 30:70 |
| Example 8 | 0.46 | 11.9 | 6.09 | 30:70 |
| Example 9 | 0.27 | 17.8 | 5.91 | 30:70 |
| Example 10 | 0.47 | 11.9 | 7.84 | 30:70 |
| Example 11 | 0.27 | 9.75 | 5.91 | 30:70 |
| Comparative Example 1 | 0.27 | — | 5.91 | 0:100 |
| Comparative Example 2 | — | 11.9 | — | 100:0 |
| Comparative Example 3 | 0.27 | 11.9 | 5.91 | 10:90 |
| Comparative Example 4 | 0.27 | 11.9 | 5.91 | 80:20 |
| Comparative Example 5 | 0.29 | 11.9 | 6.28 | 30:70 |
| Comparative Example 6 | 0.27 | 10.5 | 5.91 | 30:70 |
| Comparative Example 7 | 0.27 | 9.91 | 5.91 | 30:70 |
| Comparative Example 8 | 0.87 | 11.9 | 9.82 | 30:70 |
| Comparative Example 9 | 0.27 | 31.2 | 5.91 | 30:70 |
| Comparative Example 10 | 0.59 | 11.9 | 11.2 | 30:70 |
| Comparative Example 11 | 0.27 | 6.12 | 5.91 | 30:70 |

(Manufacturing of Test Battery)

A first cathode active material having a composition ratio of Ni:Mn:Co=70:15:15, and having an average primary particle size of 1.33 μm and an average secondary particle size of 11.9 μm, and a carbon-based conductive agent were weighed to have a mass ratio of 85:10.7, and then the active material and the conductive agent were combined into a composite compound using a mechanofusion system.

Also, a second cathode active material having a composition ratio of Ni:Mn:Co=40:30:30, and having an average primary particle size of 0.27 μm and an average secondary particle size of 5.91 μm, and a carbon-based conductive agent were weighed to have a mass ratio of 85:10.7, and then the active material and the conductive agent were combined into a composite compound using the mechanofusion system.

Then, the composite first cathode active material and the composite second cathode active material were mixed at a mass ratio of 30:70. Thereafter, a mixture of the two kinds of cathode active materials and the conductive material, and a binder dissolved in an NMP were mixed such that the mixture and binder have a mass ratio of 95.7:4.3 to form a slurry. The slurry uniformly mixed was applied to an aluminum foil current collector having a thickness of 20 μm, then dried at a temperature of 120° C., and compression-molded by pressing such that an electrode density is 2.7 g/cm³. Thereafter, the aluminum foil molded was punched out into a disk having a diameter of 15 mm thereby to produce a cathode.

A test battery was manufactured using the cathode produced, lithium metal as an anode, and a none-aqueous electrolyte. The nonaqueous electrolyte used was one obtained by dissolving $LiPF_6$ at a concentration of 1.0 mol/liter in a mixed solvent containing ethylene carbonate (EC) and dimethyl carbonate (DMC) at a ratio of volume of 1:2.

Example 2

In Example 2, the first cathode active material and second cathode active material which were manufactured in Example 1 were mixed together at a mass ratio of 50:50 thereby to produce a cathode material, which was used in the cathode. A test battery was manufactured in the same way as that in Example 1 except for the above condition.

Example 3

In Example 3, the first cathode active material and second cathode active material which were manufactured in Example 1 were mixed together at a mass ratio of 70:30 thereby to produce a cathode material, which was used in the cathode. A test battery was manufactured in the same way as that in Example 1 except for the above condition.

Example 4

In Example 4, the first cathode active material and second cathode active material which were manufactured in Example 1 were mixed together at a mass ratio of 15:85 thereby to produce a cathode material, which was used in the cathode. A test battery was manufactured in the same way as that in Example 1 except for the above condition.

Example 5

In Example 5, the first cathode active material manufactured in Example 1, and a second cathode active material manufactured in the same way as that in Example 1 to have a composition ratio of Ni:Mn:Co=50:25:25, an average primary particle size of 0.25 μm, and an average secondary particle size of 6.51 μm were mixed together at a mass ratio of 30:70 thereby to produce a cathode material, which was used in the cathode. A test battery was manufactured in the same way as that in Example 1.

Example 6

In Example 6, a first cathode active material manufactured in the same way as that in Example 1 to have a composition ratio of Ni:Mn:Co=60:20:20, an average primary particle size of 1.41 μm, and an average secondary particle size of 11.1 μm, and the second cathode active material manufactured in Example 1 were mixed together at a mass ratio of 30:70 thereby to produce a cathode material, which was used in the cathode. A test battery was manufactured in the same way as that in Example 1.

Example 7

In Example 7, a first cathode active material manufactured in the same way as that in Example 1 to have a composition ratio of Ni:Mn:Co=70:15:15, an average primary particle size of 1.89 μm, and an average secondary particle size of 13.5 μm, and the second cathode active material manufactured in Example 1 were mixed together at a mass ratio of 30:70 thereby to produce a cathode material, which was used in the cathode. A test battery was manufactured in the same way as that in Example 1.

Example 8

In Example 8, the first cathode active material manufactured in Example 1, and a second cathode active material manufactured in the same way as that in Example 1 to have a composition ratio of Ni:Mn:Co=40:30:30, an average primary particle size of 0.46 μm, and an average secondary particle size of 6.09 μm were mixed together at a mass ratio of 30:70 thereby to produce a cathode material, which was used in the cathode. A test battery was manufactured in the same way as that in Example 1.

Example 9

In Example 9, a first cathode active material manufactured in the same way as that in Example 1 to have a composition ratio of Ni:Mn:Co=70:15:15, an average primary particle size of 1.68 μm, and an average secondary particle size of 17.8 μm, and the second cathode active material manufactured in Example 1 were mixed together at a mass ratio of 30:70 thereby to produce a cathode material, which was used in the cathode. A test battery was manufactured in the same way as that in Example 1.

Example 10

In Example 10, the first cathode active material manufactured in Example 1, and a second cathode active material manufactured in the same way as that in Example 1 to have a composition ratio of Ni:Mn:Co=40:30:30, an average primary particle size of 0.47 μm, and an average secondary particle size of 7.84 μm were mixed together at a mass ratio of 30:70 thereby to produce a cathode material, which was used in the cathode. A test battery was manufactured in the same way as that in Example 1.

Example 11

In Example 11, a first cathode active material manufactured in the same way as that in Example 1 to have a composition ratio of Ni:Mn:Co=70:15:15, an average primary particle size of 1.16 μm, and an average secondary particle size of 9.75 μm, and the second cathode active material manufactured in Example 1 were mixed together at a mass ratio of 30:70 thereby to produce a cathode material, which was used in the cathode. A test battery was manufactured in the same way as that in Example 1.

Comparative Example 1

In Comparative Example 1, only the second cathode active material manufactured in Example 1 was used in the cathode. A test battery was manufactured in the same way as that in Example 1.

Comparative Example 2

In Comparative Example 2, only the first cathode active material manufactured in Example 1 was used in the cathode. A test battery was manufactured in the same way as that in Example 1.

Comparative Example 3

In Comparative Example 3, the first cathode active material and the second cathode active material which were manufactured in Example 1 were mixed together at a mass ratio of 10:90 thereby to produce a cathode material, which was used in the cathode. A test battery was manufactured in the same way as that in Example 1.

Comparative Example 4

In Comparative Example 4, the first cathode active material and the second cathode active material which were manufactured in Example 1 were mixed together at a mass ratio of 80:20 thereby to produce a cathode material, which was used in the cathode. A test battery was manufactured in the same way as that in Example 1.

Comparative Example 5

In Comparative Example 5, the first cathode active material manufactured in Example 1, and a second cathode active material manufactured in the same way as that in Example 1 to have a composition ratio of Ni:Mn:Co=60:20:20, an average primary particle size of 0.29 μm, and an average secondary particle size of 6.28 μm were mixed together at a mass ratio of 30:70 thereby to produce a cathode material, which was used in the cathode. A test battery was manufactured in the same way as that in Example 1.

Comparative Example 6

In Comparative Example 6, a first cathode active material manufactured in the same way as that in Example 1 to have a composition ratio of Ni:Mn:Co=50:25:25, an average primary particle size of 1.18 μm, and an average secondary particle size of 10.5 μm, and the second cathode active material manufactured in Example 1 were mixed together at a mass ratio of 30:70 thereby to produce a cathode material, which was used in the cathode. A test battery was manufactured in the same way as that in Example 1.

Comparative Example 7

In Comparative Example 7, a first cathode active material manufactured in the same way as that in Example 1 to have a composition ratio of Ni:Mn:Co=70:15:15, an average primary particle size of 0.79 μm, and an average secondary particle size of 9.91 μm, and the second cathode active material manufactured in Example 1 were mixed together at a mass ratio of 30:70 thereby to produce a cathode material, which was used in the cathode. A test battery was manufactured in the same way as that in Example 1.

Comparative Example 8

In Comparative Example 8, the first cathode active material manufactured in Example 1, and a second cathode active material manufactured in the same way as that in Example 1 to have a composition ratio of Ni:Mn:Co=40:30:30, an average primary particle size of 0.87 μm, and an average secondary particle size of 9.82 μm were mixed together at a mass ratio of 30:70 thereby to produce a cathode material, which was used in the cathode. A test battery was manufactured in the same way as that in Example 1.

Comparative Example 9

In Comparative Example 9, a first cathode active material manufactured in the same way as that in Example 1 to have a composition ratio of Ni:Mn:Co=70:15:15, an average primary particle size of 1.62 μm, and an average secondary particle size of 31.2 μm, and the second cathode active material manufactured in Example 1 were mixed together at a mass ratio of 30:70 thereby to produce a cathode material, which was used in the cathode. In a classification process, coarse particles having a particle size of 50 μm or more were removed. Then, a test battery was manufactured in the same way as that in Example 1.

Comparative Example 10

In Comparative Example 10, the first cathode active material manufactured in Example 1, and a second cathode active material manufactured in the same way as that in Example 1 to have a composition ratio of Ni:Mn:Co=40:30:30, an average primary particle size of 0.59 μm, and an average secondary particle size of 11.2 μm were mixed together at a mass ratio of 30:70 thereby to produce a cathode material, which was used in the cathode. A test battery was manufactured in the same way as that in Example 1.

Comparative Example 11

In Comparative Example 11, a first cathode active material manufactured in the same way as that in Example 1 to have a composition ratio of Ni:Mn:Co=70:15:15, an average primary particle size of 1.09 μm, and an average secondary particle size of 6.12 μm, and the second cathode active material manufactured in Example 1 were mixed together at a mass ratio of 30:70 thereby to produce a cathode material, which was used in the cathode. A test battery was manufactured in the same way as that in Example 1.

The batteries manufactured in the above-mentioned Examples 1 to 11, and Comparative Examples 1 to 11 were used to perform the following tests.

(Charge-Discharge Test)

Figure 2:
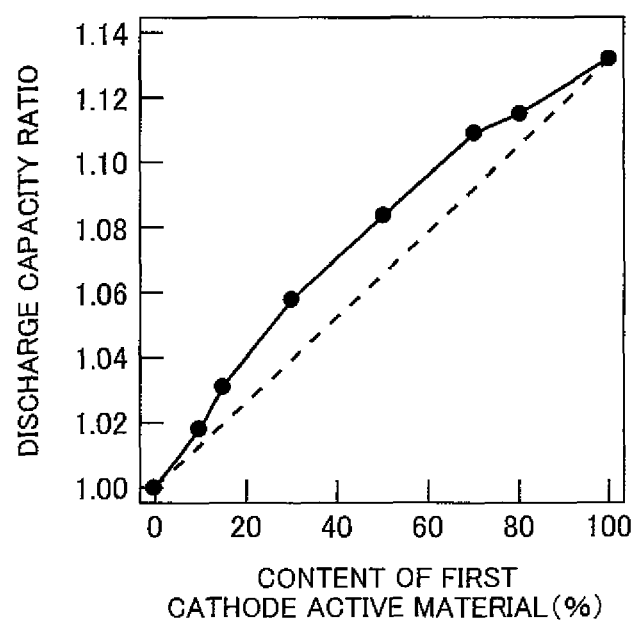
FIG. 2 shows the relationship between a discharge capacity ratio and a content of a first cathode active material of the mixed cathode material according to the invention.

Each test battery in use was charged by constant current/constant voltage to 4.3 V at a charging rate of 0.2 C, and then discharged at constant current at 0.2 C up to 3.0 V. An initial discharge capacity of each battery was compared with an initial discharge capacity in Comparative Example 1 to determine a value as a discharge capacity ratio, which is shown in Tables 2 to 6. The term "discharge capacity ratio" as used herein means the value of (initial discharge capacity in each of Example and Comparative Example/initial discharge capacity in Comparative Example 1). FIG. 2 shows the relationship between the content (percentage by mass) of the first cathode active material and the discharge capacity ratio in the cathode material. In FIG. 2, the discharge capacity ratio calculated from the capacity of only the first cathode active material, only the second cathode active material, and the respective contents are shown by a dotted line in the figure.

(Direct Current Resistance Measurement)

Figure 3:
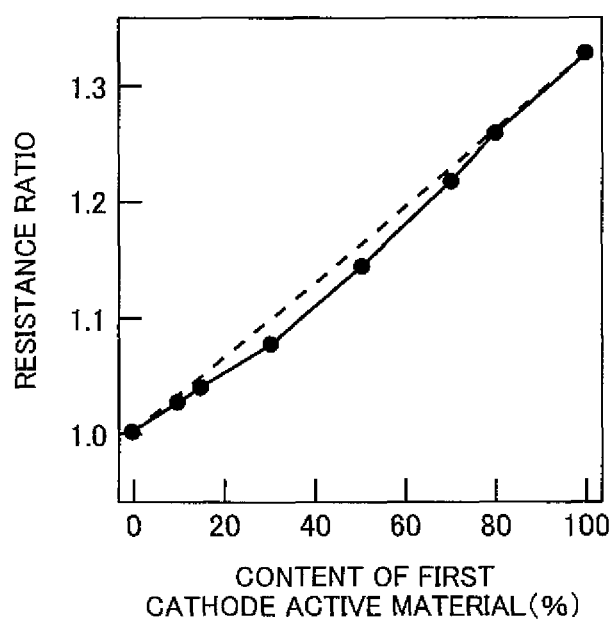
FIG. 3 shows the relationship between a resistance ratio and the content of the first cathode active material of the mixed cathode material according to the invention.

An electrode resistance of each test battery in use was measured at room temperature. Discharging of the test battery at constant current was performed at an open-circuit voltage of the test battery in a range from 3.7 V to 4.4 V. The voltage of the battery in discharging was recorded every 0.1 seconds. Then, a voltage drop at 10 seconds after a start point of the open-circuit voltage was measured to determine an electrode resistance. The resistance ratio of the electrode resistance of each battery to an electrode resistance value in Comparative Example 1 is shown in Tables 2 to 6. The term "resistance ratio" as used herein means the value of (resistance in each of Example and Comparative Example)/(resistance in Comparative Example 1). FIG. 3 shows the relationship between the content (percentage by mass) of the first cathode active material and the resistance ratio in the cathode material. In FIG. 3, the resistance ratio calculated from the resistance of the first cathode active material, the second cathode active material and the respective contents are shown by a dotted line in the figure.

(Differential Scanning Calorimetry)

Each test battery in use was charged by constant current/constant voltage to 4.3 V. An electrode was removed from the test battery, washed with dimethyl carbonate (DMC), and punched out into a disk having a diameter of 3.5 mm. The disk-like specimen was placed in a sample pan, and an electrolyte of 1 μl was added to the specimen, which was then sealed. The exothermal behavior of the specimen was examined by increasing its temperature at a rate of 5° C./min. The temperature at which a heat flow rate reached a maximum value was defined as a heat generating temperature. The heat generating temperatures in Examples and Comparative Examples are shown in Tables 2 to 6.

TABLE 2

| | Discharge capacity ratio | Resistance ratio | Heat generating temperature ( ) | Composition ratio (first active material:second active material) |
|---|---|---|---|---|
| Example 1 | 1.058 | 1.077 | 287 | 30:70 |
| Example 2 | 1.084 | 1.145 | 287 | 50:50 |
| Example 3 | 1.109 | 1.219 | 277 | 70:30 |
| Example 4 | 1.031 | 1.039 | 293 | 15:85 |
| Comparative Example 1 | 1.000 | 1.000 | 302 | 0:100 |
| Comparative Example 2 | 1.132 | 1.330 | 266 | 100:0 |
| Comparative Example 3 | 1.018 | 1.026 | 298 | 10:90 |
| Comparative Example 4 | 1.115 | 1.260 | 273 | 80:20 |

TABLE 3

| | Discharge capacity ratio | Resistance ratio | Heat generating temperature ( ) | Ni content of first cathode active material (atomic percentage) | Ni content of second cathode active material (atomic percentage) |
|---|---|---|---|---|---|
| Example 1 | 1.058 | 1.077 | 287 | 70 | 40 |
| Example 5 | 1.083 | 1.076 | 279 | 70 | 50 |
| Example 6 | 1.041 | 1.076 | 286 | 60 | 40 |
| Comparative Example 5 | 1.115 | 1.080 | 251 | 70 | 60 |
| Comparative Example 6 | 1.025 | 1.075 | 299 | 50 | 40 |

TABLE 4

| | Discharge capacity ratio | Resistance ratio | Heat generating temperature ( ) | Primary particle size of first active material (μm) | Primary particle size of second active material (μm) |
|---|---|---|---|---|---|
| Example 1 | 1.058 | 1.077 | 287 | 1.31 | 0.27 |
| Example 7 | 1.056 | 1.079 | 289 | 1.89 | 0.27 |
| Example 8 | 1.058 | 1.079 | 287 | 1.33 | 0.46 |
| Comparative Example 7 | 1.058 | 1.079 | 257 | 0.79 | 0.27 |
| Comparative Example 8 | 1.049 | 1.268 | 303 | 1.33 | 0.87 |

TABLE 5

| | Discharge capacity ratio | Resistance ratio | Heat generating temperature ( ) | Secondary particle size of first active material (μm) | Secondary particle size of second active material (μm) |
|---|---|---|---|---|---|
| Example 1 | 1.058 | 1.077 | 287 | 11.9 | 5.91 |
| Example 9 | 1.058 | 1.088 | 291 | 17.8 | 5.91 |
| Example 10 | 1.056 | 1.085 | 287 | 11.9 | 7.84 |
| Comparative Example 9 | 1.040 | 1.121 | 292 | 31.2 | 5.91 |
| Comparative Example 10 | 1.039 | 1.130 | 298 | 11.9 | 11.2 |

TABLE 6

|  | Discharge capacity ratio | Resistance ratio | Heat generating temperature ( ) | Secondary particle size ratio (first/second) |
|---|---|---|---|---|
| Example 1 | 1.058 | 1.077 | 287 | 2.01 |
| Example 11 | 1.055 | 1.074 | 278 | 1.65 |
| Comparative Example 11 | 1.048 | 1.053 | 266 | 1.04 |

(Contents of First Cathode Active Material and Second Cathode Active Material)

As can be seen from Table 2, the discharge capacity ratio in each of Examples 1 to 4 and Comparative Examples 1 to 4 increases with increasing content of the first cathode active material. FIG. 2 shows that the discharge capacity ratio in each of Examples 1 to 4 is high as compared to the discharged capacity ratio of each of Comparative Examples 1 and 2 represented by a dotted line and calculated from a discharge capacity of each of Comparative Examples 1 and 2 and a mixing ratio thereof. Further, FIG. 3 shows that the resistance ratio in each of Examples 1 to 4 is low as compared to a resistance ratio of each of Comparative Examples 1 and 2 calculated from a resistance of each of Comparative Examples 1 and 2 and a mixing ratio thereof. This is based on the following fact.

That is, the second cathode active material including secondary particles with a small particle size enters a gap between the first cathode active materials including secondary particles with a large particle size, which improves the mixed state and filling rate of two kinds of active materials. Thus, the network is formed between the particles, resulting in a decrease in ratio of the amount of the isolated active material particles not contributing to the charging and discharging reactions to that of the other particles.

In each of Comparative Examples 3 and 4, the similar discharge capacity ratio to that calculated from the discharge capacity and the mixed ratio of each of Comparative Examples 1 and 2 was obtained. This is because the content of one of the cathode active materials is so low that the above-mentioned effects cannot be obtained. The first cathode active material content in the cathode material needs to be not less than 15% nor more than 70%.

(Composition Ratio of First Cathode Active Material to Second Cathode Active Material)

As can be seen from Table 3, the discharge capacity ratio, the resistance ratio, and the heat generating temperature in each of Examples 5 and 6 has the similar values to those of Example 1, and the heat generating temperature becomes low in Comparative Example 5. This is because the Ni content of the second cathode active material with the small particle size is 60%, whereby the active material with a high content of Ni having the small particle size exists to cause heat generation from at a low temperature. In order to obtain the cathode material with high safety, it is necessary to set the Ni content of the cathode active material with a small particle size to 50% or less.

In Comparative Example 6, the discharge capacity ratio is decreased. This is because the Ni content of the first cathode active material is 50%, whereby the Ni content mainly contributing to the charging and discharging is decreased and thus an adequate capacity cannot be obtained. In order to obtain the cathode material with high capacity, it is necessary to set the Ni content of the cathode active material with a large particle size to 60% or more.

When a difference of Ni content between two kinds of cathode active materials is small, the size of the active material with a high content of Ni, or the Ni content of the active material has to be reduced. Thus, the high capacity, high output, and high safety cannot be satisfied at the same time. A difference in Ni content between the two kinds of active materials needs to be equal to or more than 20%.

(Primary Particle Size of First Cathode Active Material and Second Cathode Active Material)

As can be seen from Table 4, the discharge capacity ratio, the resistance ratio, and the heat generating temperature in each of Examples 7 and 8 has the similar values to those of Example 1, and the heat generating temperature in Comparative Example 7 is low. This is because the particle size of the cathode active material with a high content of Ni whose crystal structure in charging is unstable is decreased up to 1 μm or less thereby to increase a contact area with the electrolyte. In order to obtain the cathode material with high safety, the size of each particle of the cathode active material with a high content of Ni needs to be 1 μm or more.

In Comparative Example 8, the resistance ratio is increased. This is because the particle size of the cathode active material with a low content of Ni is increased thereby to decrease the contact area with the electrolyte. In order to obtain the cathode material with high output, the primary particle size of the cathode active material with a low content of Ni needs to be 0.5 μm or less.

(Secondary Particle Size of First Cathode Active Material and Second Cathode Active Material)

As can be seen from Table 5, the resistance ratio in each of Examples 9 and 10 has the similar value to that of Example 1, but the resistance ratio in each of Comparative Examples 9 and 10 is high. This is because the surface area becomes smaller with increasing secondary particle size, so that the contact area with the electrolyte is decreased. In order to obtain the cathode material with high output, the secondary particle sizes of the first cathode active material and the second cathode active material need to be equal to or less than 30 μm and 10 μm, respectively.

(Ratio of Secondary Particle Size of First Cathode Active Material to that of Second Cathode Active Material)

As can be seen from Table 6, the discharge capacity ratio in Example 11 is the similar value to that in Example 1, but the discharge capacity ratio in Comparative Example 11 is low. This is because a small difference in secondary particle size between the first and second cathode active materials narrows the distribution of secondary particle sizes, reduces the filling rate of the particles, and thus makes it difficult to form the network between the particles. The heat generating temperature is also low. This is because the particle size of the cathode active material with a high content of Ni is decreased thereby to increase the contact area with the electrolyte. In order to obtain the cathode material with high capacity and high safety, a difference in secondary particle size between the two kinds of active materials needs to be set such that the secondary particle size of one active material is 1.5 times or more as large as that of the other.

What is claimed is:
1. A lithium ion secondary battery including a cathode for absorbing and releasing lithium and an anode for absorbing and releasing lithium which are formed with an electrolyte positioned therebetween,
wherein the cathode comprises a cathode active material, a cathode mixture containing a carbon-based conductive agent and a binder, and a current collector, the cathode active material comprising:

a first cathode active material represented by the composition formula: $Li_{x1}Ni_{a1}Mn_{b1}Co_{c1}O_2$, where $0.2 \le x1 \le 1.2$, $0.7 \le a1 \le 0.9$, $0.05 \le b1 \le 0.3$, $0.05 \le c1 \le 0.3$, and a second cathode active material represented by the composition formula: $Li_{x2}Ni_{a2}Mn_{b2}Co_{c2}O_2$, where $0.2 \le x2 \le 1.2$, $0.4 \le a2 \le 0.5$, $0.05 \le b2 \le 0.5$, $0.05 \le c2 \le 0.5$, wherein a content of the first cathode active material in the cathode active material is not less than 15% nor more than 70% in terms of percentage by mass, wherein a difference in Ni content between the first cathode active material and the second cathode active material is equal to or more than 20% and equal to or less than 90% in terms of atomic percentage, and wherein the first cathode active material has an average primary particle size of not less than 1 μm nor more than 3 μm, the second cathode active material has an average primary particle size of not less than 0.05 μm nor more than 0.5 μm, an average secondary particle size of the first cathode active material is 1.5 times or more as large as an average secondary particle size of the second cathode active material, and the average secondary particle size of the first cathode active material is equal to or more than 5 μm and equal to or less than 30 μm, and the average secondary particle size of the second cathode active material is equal to or more than 2 μm and equal to or less than 10 μm.

2. The lithium ion secondary battery according to claim 1, wherein the first cathode active material is represented by the composition formula: $Li_{x1}Ni_{a1}Mn_{b1}Co_{c1}O_2$, where $0.2 \le x1 \le 1.0$, a1 is 0.7, $0.05 \le b1 \le 0.3$, $0.05 \le c1 \le 0.3$, the second cathode active material is represented by the composition formula: $Li_{x2}Ni_{a2}Mn_{b2}Co_{c2}O_2$, where $0.2 \le x2 \le 1.0$, $0.4 < a2 \le 0.5$, $0.05 \le b2 \le 0.5$, $0.05 \le c2 \le 0.5$, and the difference in Ni content between the first cathode active material and the second cathode active material is equal to or more than 20% and equal to or less than 30% in terms of atomic percentage.

* * * * *